(12) United States Patent
Agarwal

(10) Patent No.: US 9,407,632 B2
(45) Date of Patent: Aug. 2, 2016

(54) TRANSFORMATION RULES FOR ONE-TIME PASSWORDS

(71) Applicant: CA, INC., Islandia, NY (US)

(72) Inventor: Gaurav Agarwal, Bangalore (IN)

(73) Assignee: CA, Inc., New York, NY (US)

( * ) Notice: Subject to any disclaimer, the term of this patent is extended or adjusted under 35 U.S.C. 154(b) by 94 days.

(21) Appl. No.: 14/486,284

(22) Filed: Sep. 15, 2014

(65) Prior Publication Data

US 2016/0080366 A1 Mar. 17, 2016

(51) Int. Cl.
*H04L 29/06* (2006.01)

(52) U.S. Cl.
CPC .................................. *H04L 63/0838* (2013.01)

(58) Field of Classification Search
CPC .................................................. H04L 63/0838
USPC .............................................................. 726/6
See application file for complete search history.

(56) References Cited

U.S. PATENT DOCUMENTS

| 7,409,705 B2 | 8/2008 | Ueda et al. | |
| 2011/0154440 A1* | 6/2011 | De Graaf | H04L 61/2015 726/3 |
| 2014/0123231 A1* | 5/2014 | Low | H04L 63/0892 726/4 |

OTHER PUBLICATIONS

Wikipedia, the free encyclopedia, "One-time password", downloaded Sep. 15, 2014 from http://en.wikipedia.org/wiki/One-time_password, 8 pp.
Wikipedia, the free encyclopedia, "Operation (mathematics)", downloaded Sep. 15, 2014 from http://en.wikipedia.org/wiki/Operation_(mathematics), 3 pp.
Wikipedia, the free encyclopedia, "Multi-factor authentication", downloaded Sep. 15, 2014 from http://en.wikipedia.org/wiki/Multi-factor_authentication, 21 pp.
Wikipedia, the free encyclopedia, "Security token", downloaded Sep. 15, 2014 from http://en.wikipedia.org/wiki/Security_token, 7 pp.

* cited by examiner

*Primary Examiner* — Jacob Lipman
(74) *Attorney, Agent, or Firm* — Myers Bigel & Sibley, P.A.

(57) ABSTRACT

A one-time password may be used and generated using transformation rules. A one-time password transformation rule is received. The one-time password is sent to a user. A response to the one-time password is received. The user is selectively authenticated based on the response corresponding to the one-time password as transformed by the one-time password transformation rule. The one-time password transformation rule may include one or more operations, such as mathematical operations that may be static operations or dynamic operations that change as a function of time. Related systems, devices, methods and computer program products are described.

19 Claims, 9 Drawing Sheets

130/130'

ENTER USERID ☐

ENTER PASSWORD ☐

YOUR ONE-TIME PASSWORD IS:

☐

PLEASE TRANSFORM IT

ENTER TRANSFORMED ONE-TIME PASSWORD

TRANSFORMATION RULES FOR ONE-TIME PASSWORDS

BACKGROUND

Various embodiments described herein relate to computer systems, devices, methods and program products and, more particularly, to passwords that are used for user authentication or access approval to gain access to a resource.

A One-Time Password (OTP) is a password that is valid for only one login transaction or session. One-time passwords may be used to reduce various shortcomings that are associated with traditional static passwords. For example, in contrast to static passwords, one-time passwords are not vulnerable to replay attacks. Thus, when a potential intruder records a one-time password that was already used to log into a session or to conduct a transaction, the intruder will not be able to abuse it, since it will no longer be valid.

One-time passwords may be generated using algorithms that typically make use of pseudorandomness or randomness. Moreover, a one-time password may be used independently or may be used as part of an online login process in which a userid and static password (also referred to as a PIN) are provided.

Various technologies may be used to deliver one-time passwords. One common technology used for the delivery of one-time passwords is text messaging. Text messaging is a ubiquitous communication channel, being directly available to nearly all mobile user devices, and through text-to-speech conversion to any mobile or landline telephone. Automated telephone calls also may be used to deliver a one-time password. Mobile phones also may be used to deliver one-time passwords, because a large customer-base already owns a mobile phone for purposes other than receiving one-time passwords. One-time passwords may also be delivered using proprietary tokens, Web-based Authentication-as-a-Service providers, and may even be provided via hard copy.

BRIEF SUMMARY

Various embodiments described herein can provide methods, systems, devices (including servers and user devices) and/or computer program products for generating and using transformation rules with one-time passwords. For example, according to some embodiments described herein, a one-time password transformation rule to be used by a user is received. A one-time password is sent to the user. A response to a one-time password is received. The user is selectively authenticated based on the response corresponding to the one-time password as transformed by the one-time password transformation rule.

In some embodiments, the one-time password transformation rule comprises a plurality of operations to be performed sequentially on the one-time password. The plurality of operations may comprise a dynamic operation that changes as a function of time and may also further comprise a static operation that does not change as a function of time. In other embodiments, a single dynamic or static operation may be used. An example of a dynamic operation is adding a number representing a current day (for example, with Sunday being "1", Monday being "2", etc.) to the one-time password. When the one-time password comprises a number, the one-time password transformation rule may comprise a mathematical operation (for example, addition, subtraction, multiplication, division, shifting, replacement, etc.), that is performed on the number. When the one-time password comprises a first alphabetic character, the one-time password transformation rule can comprise a transformation that is performed on the first alphabetic character to produce a second alphabetic character (for example, replace a letter of the one-time password with the first letter of the user's last name). When the one-time password comprises a first symbol, the one-time password transformation rule may comprise a transformation that is performed on the first symbol to produce a second symbol (for example, replace the first period in the one-time password with an exclamation point). Various combinations and subcombinations of these one-time password transformation rules may also be provided.

One-time password processing according to any of the embodiments described herein may be used independently or may be used in combination with userid and static password authorization. Specifically, in some embodiments, the sending of a one-time password to the user may be preceded by receiving a userid and a static password from the user. The one-time password is selectively sent to the user responsive to authenticating the userid and the static password. Moreover, any of the embodiments described herein may further comprise proceeding with a transaction (including a session) in response to a confirmation that the response corresponds to the one-time password as transformed by the one-time password transformation rule.

The one-time password transformation rule may be set by a user according to various embodiments described herein. In some embodiments, a list of a plurality of one-time password transformation rules is provided and a selection of one of the plurality of one-time password transformation rules is received. In other embodiments, a user may be allowed to create a proposed one-time password transformation rule. In these embodiments, the proposed one-time password transformation rule is received, and a confirmation that the proposed one-time password transformation rule is acceptable is selectively sent, responsive to verification that the proposed one-time password transformation rule meets a predefined criterion.

The embodiments described above may be performed by a server that selectively authenticates a user based on a one-time password as transformed by a one-time password transformation rule. For example, according to various embodiments described herein, the receiving a one-time password transformation rule, the sending a one-time password to the user, the receiving a response to the one-time password, and the selectively authenticating the user based on the response corresponding to the one-time password as transformed by the one-time password transformation rule, are all performed by a server that communicates with the user device of the user. However, in other embodiments, the embodiments described above may be performed by the user device of the user. Thus, for example, the receiving a one-time password transformation rule, the sending a one-time password to the user, the receiving a response to the one-time password, and the selectively authenticating the user based on the response corresponding to the one-time password as transformed by the one-time password transformation rule, are all performed by the user device of the user. In yet other embodiments, a server and the user device may both share in performing the processing.

According to various other embodiments described herein, a one-time password transformation rule may be defined, for example by selection from a menu that is presented and/or by defining a proposed one-time password transformation rule. A one-time password is received and a response to the one-time password is sent, where the response is based on the user transforming the one-time password using the one-time password transformation rule. In some embodiments, the defining the one-time password transformation rule, the receiving the one-time password, and the sending the response to the one-time password, are all performed by the user device of the user. However, in other embodiments, the defining the one-time password transformation rule, the receiving the one-time password, and the sending the response to the one-time password, are all performed by the server. In still other embodiments, the server and the user device may both share in performing the processing.

Various embodiments described herein may provide methods that can be performed by a server and/or a user device for selectively authenticating a user based on a one-time password as transformed by a one-time password transformation rule. Moreover, various other embodiments described herein can provide a computer program, such as an authentication computer program that is located at a server and/or at a user device, that uses a one-time password transformation rule according to any of the embodiments described herein. Finally, various other embodiments described herein can provide a computer system. The computer system may comprise one or more processors, one or more memory devices, one or more input/output devices and a computer program product that runs on the processor(s) and uses a one-time password transformation rule according to any of the embodiments described herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 4-6 illustrate a user interface according to various embodiments described herein.

DETAILED DESCRIPTION

Figure 1A:
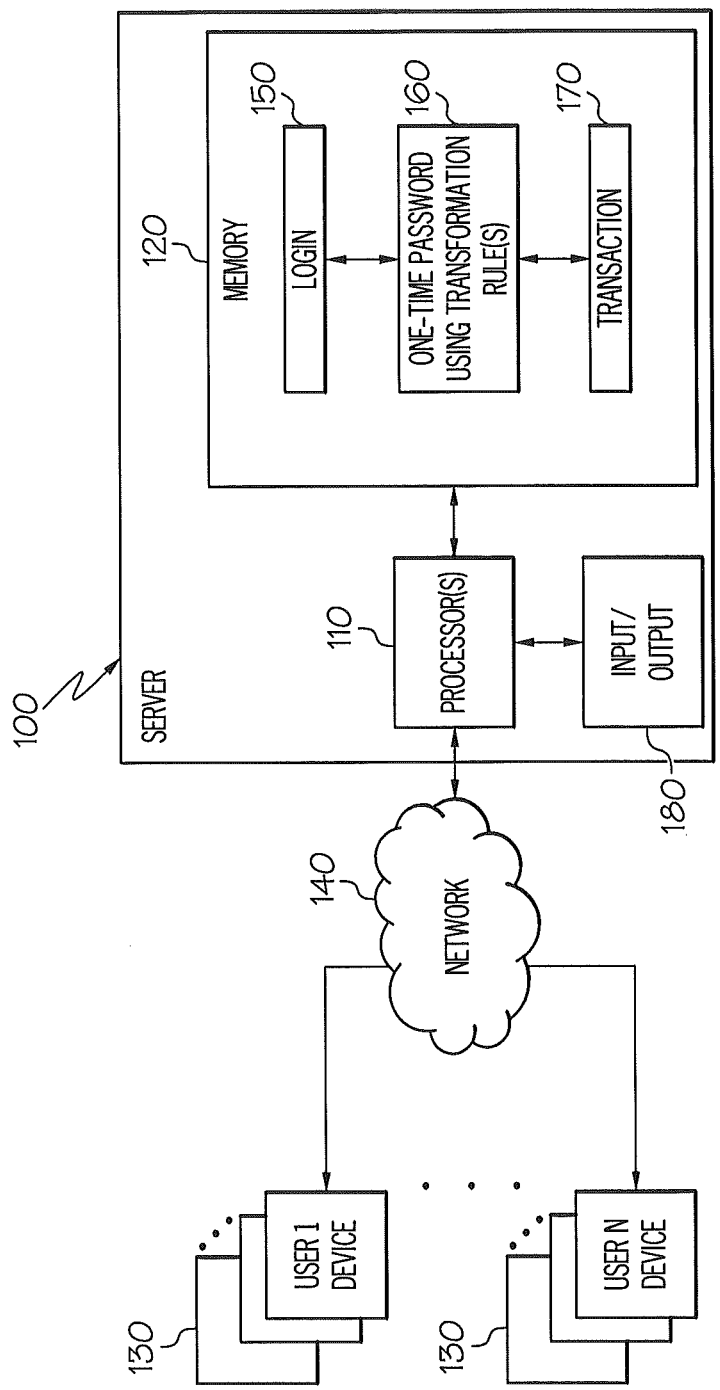
FIGS. 1A and 1B are block diagrams of a computer system, method and/or program product that can generate and use transformation rules for one-time passwords according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Various embodiments described herein may arise from a recognition that a traditional one-time password may work on the assumption that a genuine user is possessing a target mobile device or email account. Unfortunately, a hacker can overcome this assumption if the hacker gets access to the mobile device or the email account of a compromised card or user account. Moreover, since the knowledge factor based on the one-time password is static, it is more vulnerable to hacking.

In sharp contrast, various embodiments described herein can potentially reduce or solve these problems by transforming a one-time password based on a one-time password transformation rule. The one-time password transformation rule includes a knowledge fact that is known only to a genuine user. The one-time password transformation rule can comprise one or more operations by which a user transforms a received one-time password. The rule may be memorized by the user. A hacker does not know the transformation rule, so that a hacker cannot derive the transformed one-time password. Stated differently, for a hacker, it is very difficult to derive the transformation rule compared to hacking a fixed password.

FIG. 1A is a block diagram of a computer system, method and/or program product that can generate and use transformation rules for one-time passwords according to various embodiments described herein. Referring to FIG. 1A, a computer system 100 may be embodied by one or more enterprise, application, personal, pervasive and/or embedded computer systems that are operable to receive, transmit, process and store data using any suitable combination of software, firmware and/or hardware, and that may be standalone or interconnected by any conventional public and/or private, real and/or virtual, wired and/or wireless network including all or a portion of the global communication network known as the Internet. One or more processors 110 communicate with one or more memories 120 that may be a combination of any one or more tangible computer readable media.

The processor(s) 110 may communicate with a plurality of user devices 130 over a network 140 that may comprise any conventional public and/or private, real and/or virtual wired and/or wireless network including the Internet. The server 100 may also include various input/output devices 180 that may include output devices such as a graphical display and/or loudspeaker, and input devices, such as a keyboard, touch screen, mouse and/or microphone.

As shown in FIG. 1A, one or more user devices 130 may be associated with a given user. User devices 130 may include tablets and/or smart phones, laptop and/or desktop computers and/or any other user terminal, and may be embodied by one or more enterprise, application, personal, pervasive and/or embedded computers, such as a desktop, notebook, net book, laptop, smart phone, electronic book reader and/or any other embedded device. The user devices 130 may also include a processor and a memory, as well as various user input/output devices that may include output devices, such as a graphical display and/or loudspeaker, and input devices, such as a keyboard, touch screen, mouse and/or microphone. The user input/output devices may also include a token reader than can read one-time passwords stored in a security token, also referred to herein as a "token", that may communicate with the user device over, for example, a USB bus.

It will also be understood that the term "server" is used herein generically to identify a computer system, method and/or computer program product that communicates with a user device over a network and should not be construed to imply a specific client/server protocol or relationship.

Still referring to FIG. 1A, stored in the memory 120 is a login system, method and/or computer program 150, a one-time password system, method and/or computer program 160 that uses the transformation rule(s) and a transaction system, method and/or computer program 170, according to various embodiments described herein, and as will be described in more detail below.

Figure 1B:
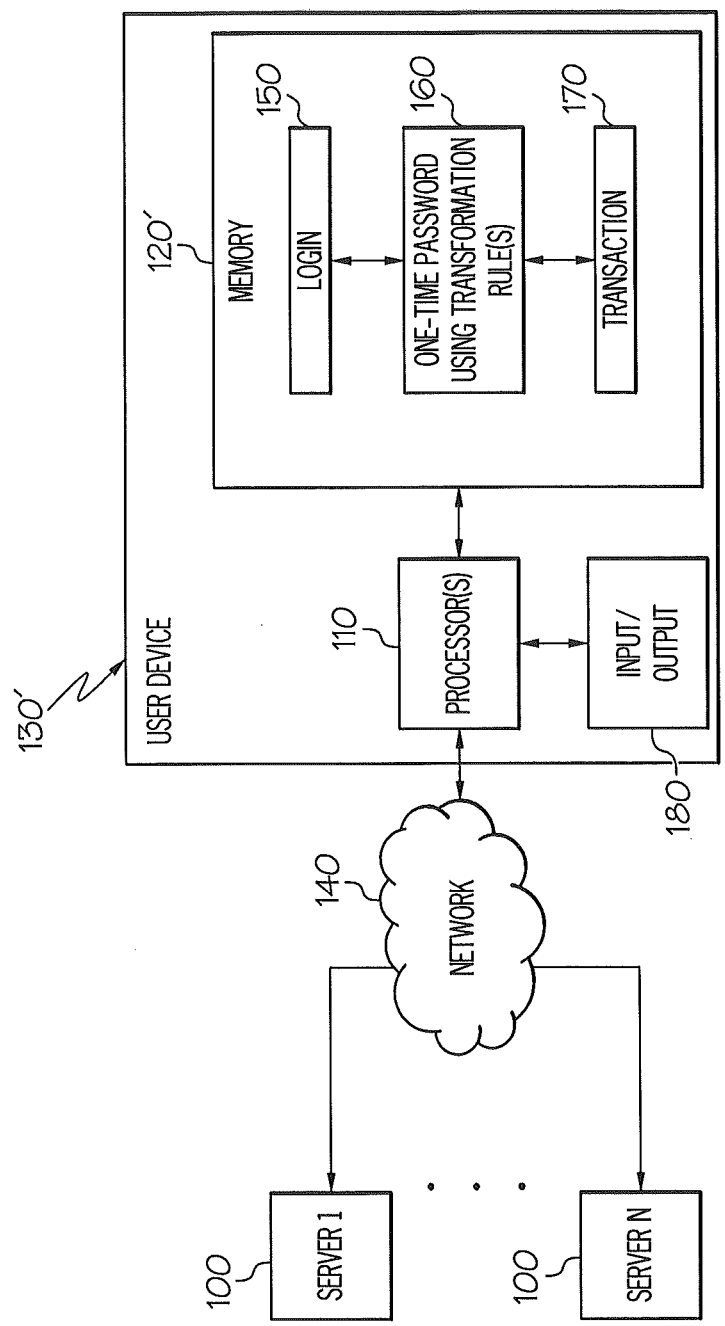

FIG. 1B is a block diagram of a computer system, method and/or computer program product that can generate and use transformation rules for one-time passwords according to various other embodiments described herein. In contrast with FIG. 1A, the memory 120' of the user device 130' also includes therein a login system, method and/or computer program 150, a one-time password system, method and/or computer program 160 that uses the transformation rule(s) and a transaction system, method and/or computer program 170 according to various embodiments described herein.

As will be described in detail below, operations related to one-time password generation and use using transformation rules may be performed by the server 100 of FIG. 1A that communicates with a user device 130 of FIG. 1A. In other embodiments, as illustrated in FIG. 1B, various operations to generate and use one-time passwords using transformation rules may be performed at the user device 130' that communicates with a server 100. Moreover, in still other embodiments, the user device 130/130' and the server 100 may both participate in performing the operations to generate and use transformation rules for one-time passwords according to various embodiments described herein.

Figure 2:
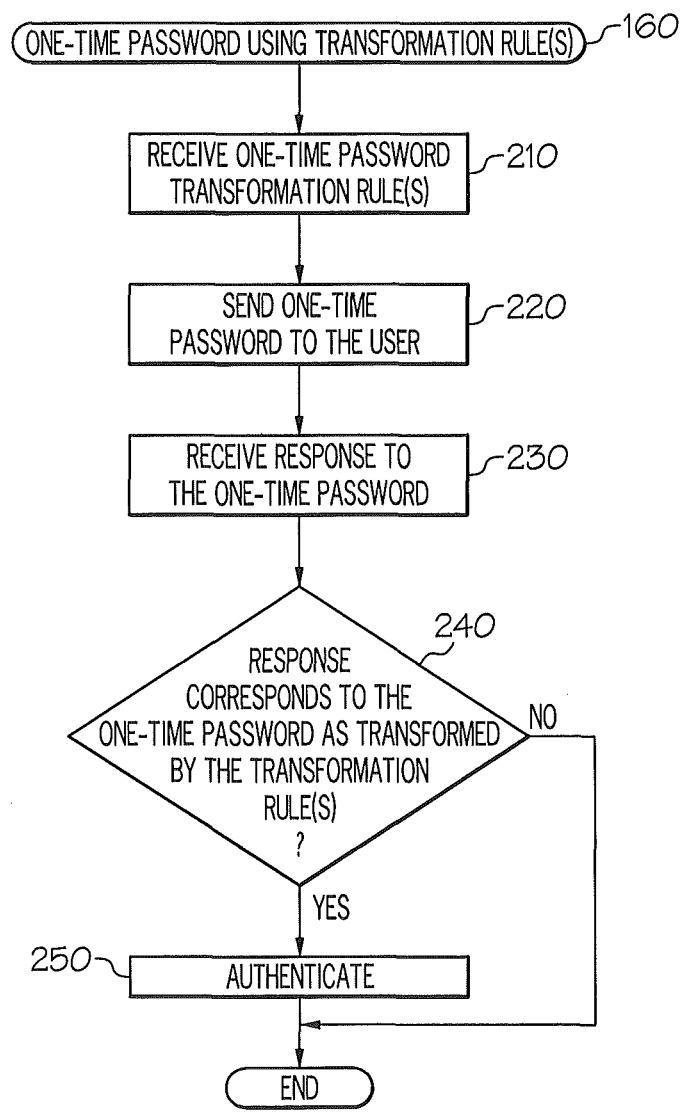
FIG. 2 is a flowchart of operations that can be performed to generate and use one-time passwords using transformation rules according to various embodiments described herein.

FIG. 2 is a flowchart of operations that may be performed to generate and use a one-time password using one or more transformation rules according to various embodiments described herein. These operations may be performed by a server 100 for example by Block 160 of FIG. 1A. Alternatively, these operations may be performed by a user device 130', for example by Block 160 of FIG. 1B. They may also be shared between the server and the user device.

Referring to FIG. 2, at Block 210, a one-time password transformation rule to be used by a user, for example a user that uses one of the user devices 130 of FIG. 1, is received, for example at the server 100 of FIG. 1A or at the user device 130' of FIG. 1B. The one-time password transformation rule may be received immediately prior to its use or well before its use, for example as part of a registration process, At Block 220, a one-time password is sent to the user, for example by sending the one-time password to a user device 130 of the user. The one-time password may be sent from the server 100, for example by sending a message to a user device 130 over the network 140, for example using a text message, email message or voice message. It will be understood, however, that in other embodiments, the sending need not be performed over a network 140 and need not be sent to the user device 130 itself. Rather, sending can be performed by providing a user with a token or a hard copy of the one-time password. Then, at Block 230, a response to the one-time password is received at the server 100 of FIG. 1A or at the user device 130' of FIG. 1B. At Block 240, a determination is made as to whether the response that was received corresponds to the one-time password that was sent at Block 220, as transformed by the transformation rule(s) that was received at Block 210. If "yes", then at Block 250, the user is authenticated, and operations may proceed. If "no", then the user is not authenticated and appropriate denial processing may be performed. Thus, Blocks 240 and 250 provide an embodiment of selectively authenticating the user based on the response corresponding to the one-time password as transformed by the one-time password transformation rule according to various embodiments described herein.

It will be understood that the operations of FIG. 2 may be performed by a server 100 that receives the one-time password transformation rules from a user device 130 at Block 210, that sends a one-time password to the user device at Block 220, that receives a response to the one-time password from the user device at Block 230 and that performs the selective authentication at Blocks 240 and 250. In other embodiments, the operations of FIG. 2 may be performed by a user device 130', such as a mobile phone and in some embodiments in conjunction with a proprietary token that communicates with a mobile phone. In these embodiments, the one-time password transformation rules of Block 210 may be generated by the user and validated at the user device, the one-time password may be sent to the user device either from the server or from a proprietary token at Block 220, the response of Block 230 may be received at the user device, and the authentication of Blocks 240 and 250 may also be performed at the user device. For example, operations of FIG. 2 be performed at a user device during an unlocking of a smart phone. The one-time password transformation rule(s) may be configured in the smart phone while setting up the screen lock of the smart phone, during registration of the smart phone and/or thereafter. When the user attempts to unlock the phone, the user may be presented with a one-time password on the screen. To unlock the phone, the user needs to enter the transformed one-time password.

Figure 3:
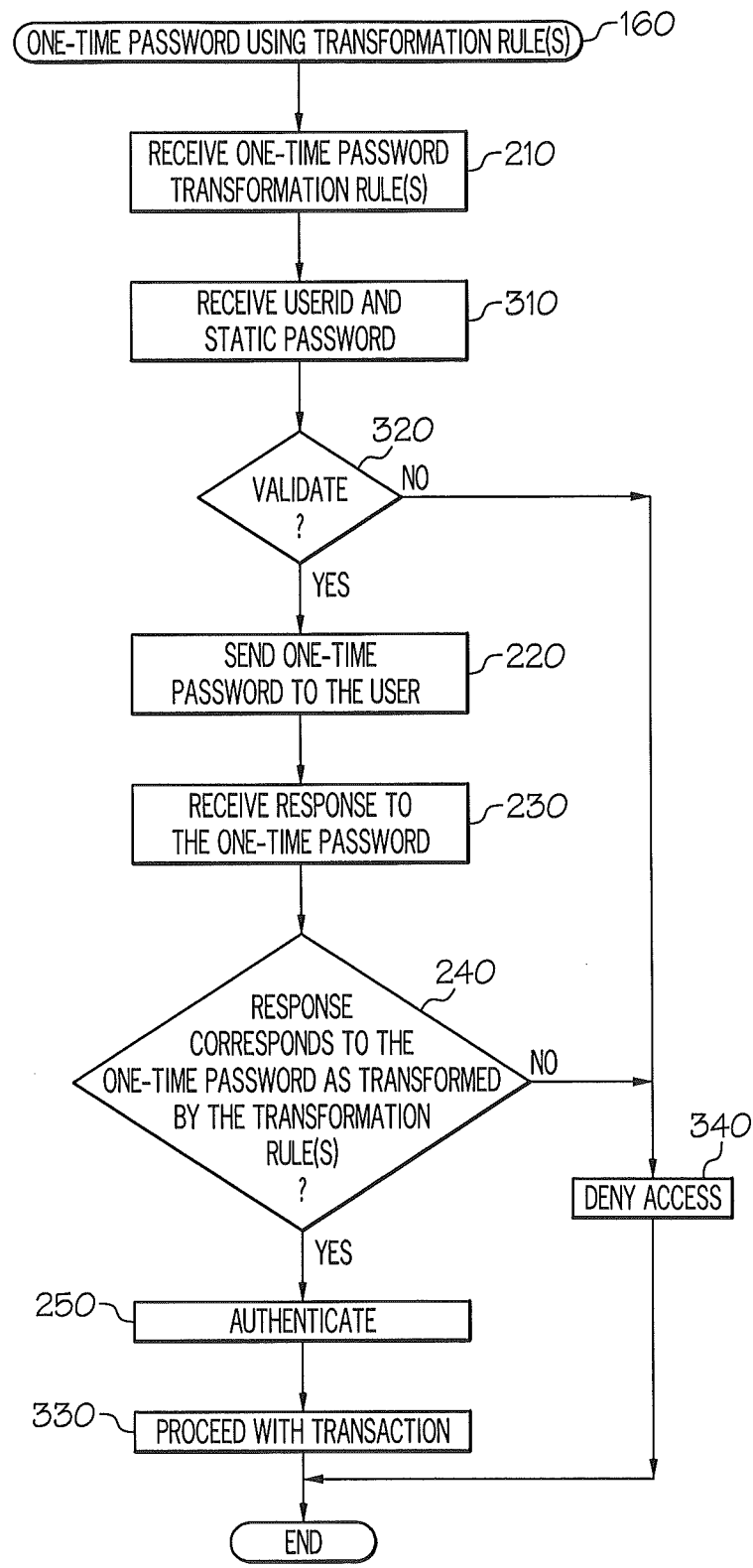
FIG. 3 is a flowchart of operations that can be performed to generate and use one-time passwords using transformation rules according to various other embodiments described herein.

FIG. 3 is a flowchart of operations to generate and use one-time passwords using transformation rules according to various other embodiments described herein. Referring now to FIG. 3, operations of Block 210 are performed to receive one or more one-time password transformation rules. At Block 310, a user attempts to log on so that the server or user device receives a userid and static password. The operations of Block 310 may be performed by a login system, method and/or computer program product 150 of FIGS. 1A and/or 1B, and may display the login screen illustrated in FIG. 4 on the user device 130/130'. If the userid and static password are validated at Block 320, for example by the login system, method and/or computer program product 150 of FIGS. 1A and/or 1B, then operations of Block 220 are performed by sending a one-time password to the user, for example by sending a message to the user device of the user that may correspond to the illustration of FIG. 5. If not, access is denied at Block 340.

Operations of Block 230 are then performed to receive a response to the one-time password. For example, a display of FIG. 6 may be displayed on the user device 130, 130' so that the user can enter the transformed one-time password.

Operations of Block 240 are then performed to determine whether the response corresponds to the one-time password as transformed by the one-time password transformation rule(s). If "no", then access is denied at Block 340. If "yes", then the user is authenticated at Block 250. Then, at Block 330, the transaction proceeds, for example by handing over control to a transaction processing system, method and/or computer program product 170 of FIGS. 1A and/or 1B. It will be understood that a "transaction" may include any transaction with a computer system, such as an e-commerce transaction, a financial transaction or a computer session.

Various embodiments for generating and processing a one-time password transformation rule according to various embodiments described herein will now be described. In general, the one-time password transformation rule comprises at least one operation that is performed on the one-time password. As used herein, an "operation" is an action or procedure which produces a new value from one or more input values called "operands". Unitary operations involve only one value, whereas binary operations, such as addition, subtraction, multiplication and division take two values. Operations can involve objects other than numbers, for example letters and/or symbols, as will be described in detail below.

In some embodiments, the one-time password transformation rule comprises a plurality of operations to be performed sequentially on the one-time password. In some embodiments, the one-time password transformation rule comprises a dynamic operation that changes as a function of time, for example that changes in response to the day of the week or the date of the month. In other embodiments, the plurality of operations may comprise both a dynamic operation that changes as a function of time and a static operation that does not change as a function of time. An example of a static mathematical operation that does not change over time includes adding one hundred to the one-time password.

Moreover, various embodiments for allowing a user to define a one-time password transformation rule may be provided according to various embodiments described herein. In some embodiments, the user may select a one-time password transformation rule from a list of one-time password transformation rules that are provided. In other embodiments, the user may generate their own proposed one-time password transformation rule, which may be confirmed for acceptability. As was described above, for best security, the one-time password transformation rule may include both a static and a dynamic operation, which may be easily memorized by a user. One example is to replace the last digit of the one-time password with a "0" (static operation), and then add the day of the week to the result, with Sunday being "1", Monday being "2", etc. (dynamic operation).

Figure 7:
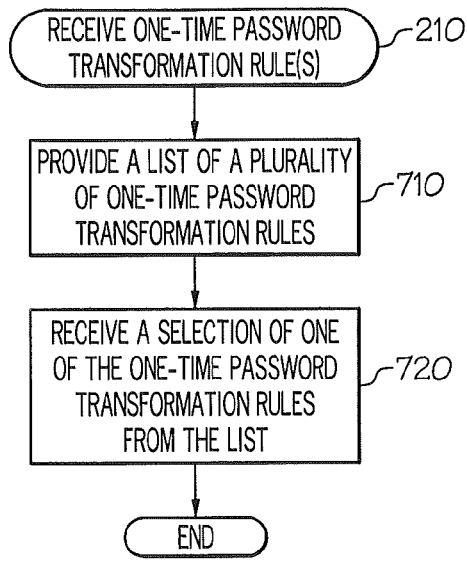
FIG. 7 is a flowchart of operations that can be performed to receive one-time password transformation rules according to various embodiments described herein.
Figure 8:
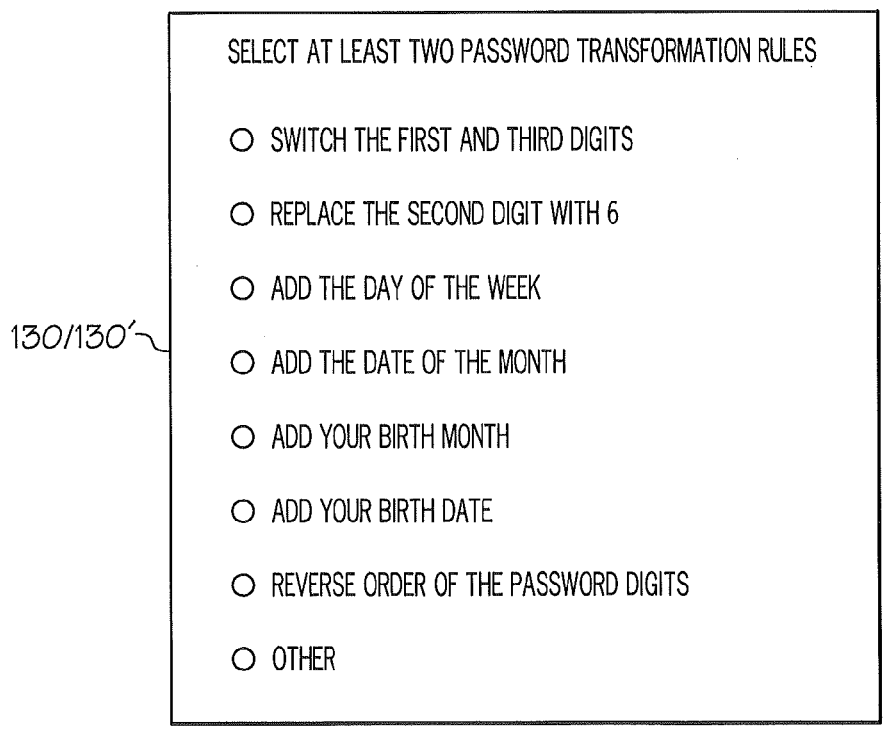
FIGS. 8 and 9 illustrate user interfaces according to various embodiments described herein.

More specifically, FIG. 7 illustrates operations that may be performed by the server and/or by the user device, to allow a user to select one or more one-time password transformation rules from a list. Referring to FIG. 7, at Block 710, a list of a plurality of one-time password transformation rules is provided by the server and/or by the user device. For example, the user device 130/130' may display the screen of FIG. 8. As shown in FIG. 8, this embodiment requires the user to select at least two of seven of the listed one-time password transformation rules.

Referring to FIG. 8, the first one-time password transformation rule is "switch the first and third digits" of the one-time password that is received. Thus, this is a static rule. The second one-time password transformation rule is "replace the second digit with 6". This is also a static password transformation rule. The third rule is "add the day of the week". This is a dynamic one-time password transformation rule because the number that is added to the one-time password will correspond to the day of the week (for example, Sunday=1, Monday=2, etc.). The fourth rule is also a dynamic rule that states "add the date of the month", so that any number from 1-31 will be added to the one-time password that is received based on the date of the month. The fifth rule is a static rule which requires the user's birth month (where January=1 and December=12) to be added to the one-time password. The sixth rule is also a static rule, wherein the user adds their birthdate (i.e., a number from 1-31) to the one-time password. The seventh rule is a static rule, wherein the user reverses the order of the password digits. Finally, a provision may be provided for "Other", wherein the user is allowed to define their own password rule, as will be described in detail below.

Referring back to FIG. 7, at Block 720, a selection of one or more of the one-time password transformation rules from the list, for example from the list of FIG. 8, is received, for example at the server and/or at the user device.

All of the rules described above (static or dynamic), have been related to replacing a number with another number. However, a one-time password may also include letters of an alphabet (i.e., an alphabetic character), and may also include symbols (such as @, &, $, !). According to other embodiments, transformation rules may be applied to letters and symbols. For example when the one-time password comprises a first alphabetic character, the one-time password transformation rule may comprise a transformation that is performed on the first alphabetic character to produce a second alphabetic character. As a specific example, the one-time password transformation rule may replace the second letter of the one-time password with the first letter of the user's last name (static) or with the first letter of the day of the week (dynamic). The one-time password may also comprise a first symbol and the one-time password transformation rule may comprise a transformation that is performed on the first symbol to produce a second symbol. Thus, for example, the one-time password transformation rule may be to replace any occurrence of a period with an exclamation point (static rule). Other rules may transform between numbers, letters and symbols, so that a rule that transforms a number may, for example, generate a letter and/or a symbol, a rule that transforms a symbol may generate a number and/or letter, and a rule that transforms a number may generate a letter and/or a symbol.

Figure 9:
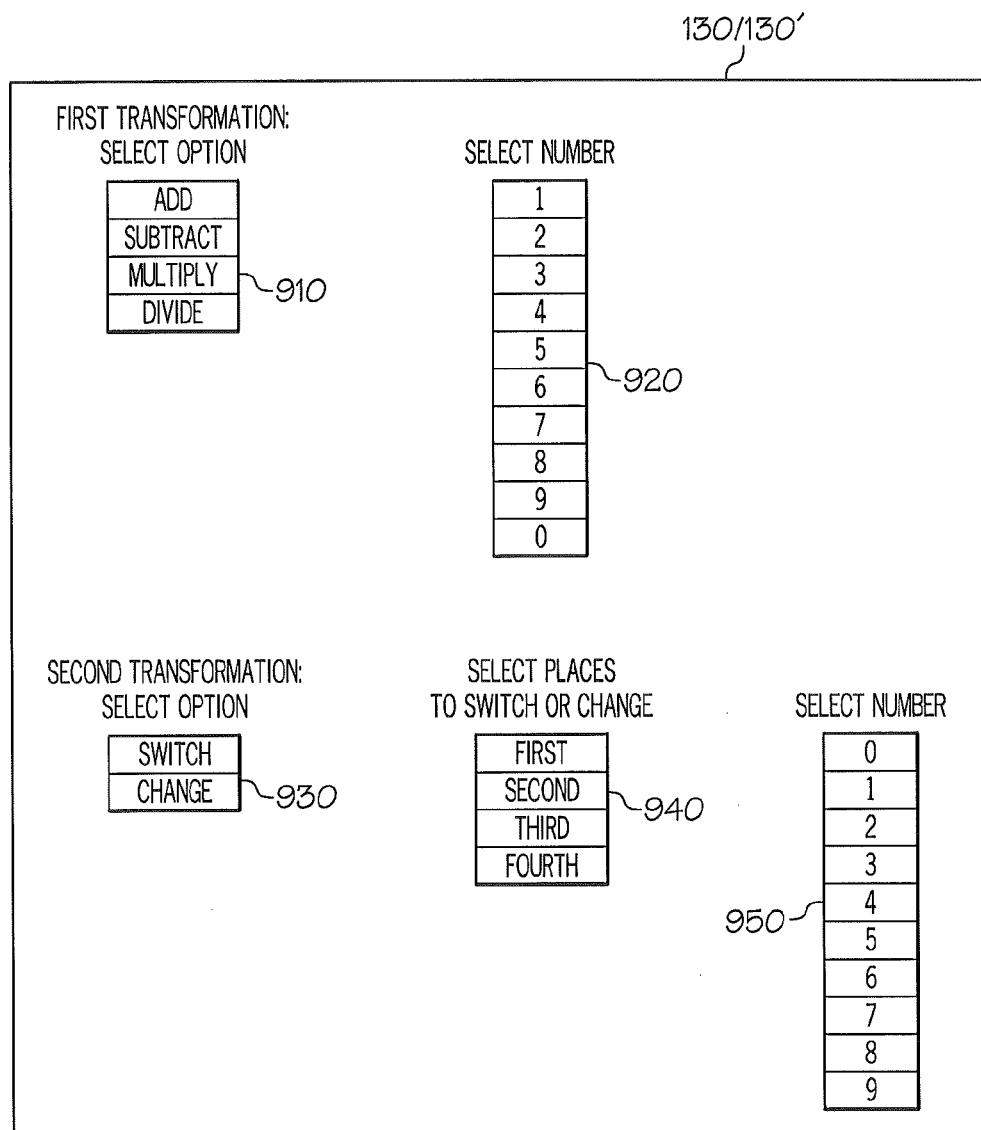

FIG. 9 illustrates a user interface on the user device 130, 130' that may allow a user to define their own one-time password transformation rule. The user interface of FIG. 9 may be sent by the server to the user device, or may be generated by the user device, in response to the selection of the "Other" selection in FIG. 8 or independently. The screen of FIG. 9 allows a user to create transformation rules based on certain predefined operations. As shown in FIG. 9, two different rules may be applied for the first and second transformations. In FIG. 9, the mathematical operations of adding, subtracting, multiplying or dividing may be selected from a dropdown box 910, and the number to be added, subtracted, multiplied or divided may be selected from the dropdown box 920. For the second transformation rule, the operation of switching digits or changing a digit in the one-time password may be selected from the dropdown box 930, the places in the one-time password to switch or change may be selected from the dropdown box 940, and if a change is selected, the number to change may be selected from the dropdown box 950. As a result of the user selection of FIG. 9, the server or user device may receive a proposed one-time password transformation rule, which may be processed as will described in FIG. 10.

Figure 10:
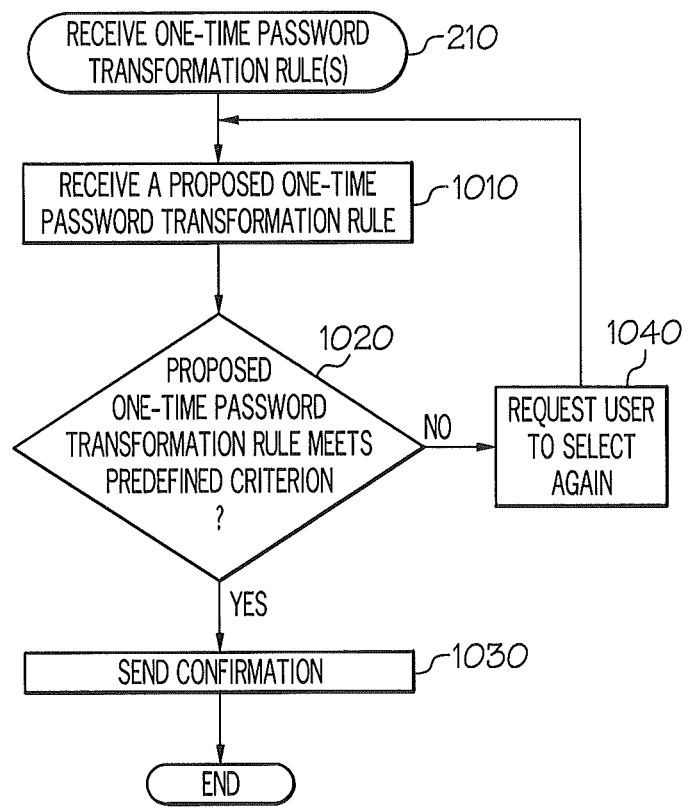
FIG. 10 is a flowchart of operations that can be performed to receive one-time password transformation rules according to various other embodiments described herein.

Referring to FIG. 10, based on the selection in FIG. 9, the server or user device may receive a proposed one-time password transformation rule at Block 1010. At Block 1020, a test is made as to whether the proposed one-time password transformation rules meets a predefined criterion for password transformation rules. The criterion may require a given number of rules in a series and/or a given complexity of the rules. Other criterion may be used. If the criterion is met, then at Block 1030, a confirmation is sent that the proposed one-time password transformation rule is acceptable. If not, then at Block 1040, a request may be sent to the user device to select again, and the operations may proceed back to Block 1010. Accordingly, the operations of Block 1020-1040 embody selectively sending a confirmation that a proposed one-time password rule is acceptable, responsive to verification that the proposed one-time password transformation rule meets a predefined criterion, according to various embodiments described herein.

In still other embodiments of FIG. 10, the user may be allowed to define a proposed one-time password transformation rule without the restriction of dropdown menus or other restrictions. Rather, the user may be able to input freeform text that defines the one-time password transformation rule that the user wishes to use. For example, when setting up a userid and static password, a user may be allowed to enter freeform text for transforming a one-time password. The text may use ordinary sentences. The operations of Block 1020 may then parse the sentences to determine the operations that are being proposed, verify that the proposed one-time password transformation rule is acceptable, and then inform the user.

Figure 11:
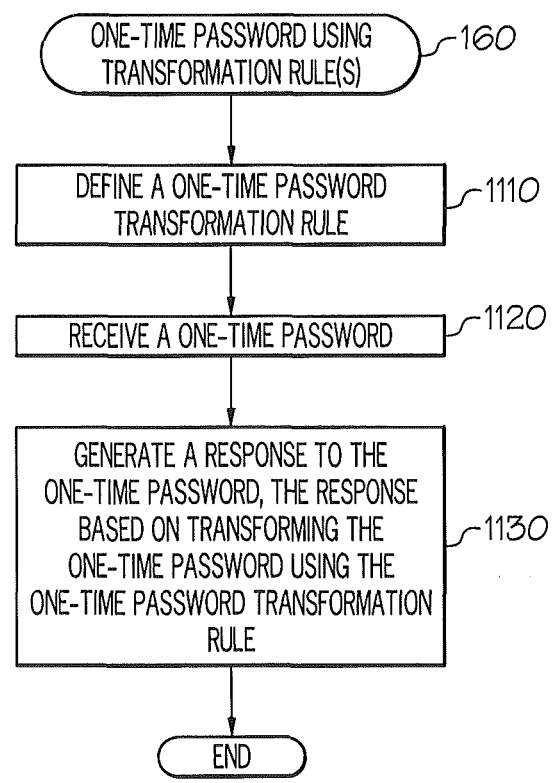
FIG. 11 is a flowchart of operations that can be performed to generate and use one-time passwords using transformation rules according to various other embodiments described herein.

FIG. 11 is a flowchart of operations that may be performed by a user device and/or by a server to use a one-time password based on one or more transformation rules, according to various embodiments described herein. Referring to FIG. 11, at Block 1110, a one-time password transformation rule is defined, for example using the user interfaces of FIG. 8 or 9.

At Block 1120, a one-time password is received, for example by displaying the user interface of FIG. 5. At Block 1130, a response to the one-time password is generated that is based on transforming the one-time password using the one-time password transformation rule. The response may be entered into a user interface of FIG. 6. The operations of FIG. 11 may be preceded by a login operation, as was described in connection with FIG. 3, and may be followed by proceeding with a transaction as also was described in connection with FIG. 3.

In some embodiments, the operations of FIG. 11 may be performed at a user device, for example using a native application that runs thereon, commonly referred to as an "app". In some embodiments, all of the operations of FIG. 11 may be performed by a device at the user device. In other embodiments, all of these operations may be performed at the server. In still other embodiments, these operations may be shared between the user device and the server.

EXAMPLES

Various additional examples of one-time password transformation rules will now be provided, according to various embodiments described herein. The following examples shall be regarded as merely illustrative and shall not be construed as limiting the invention.

Example 1

The following one-time password transformation operations may be performed in the following order:

1. Switching the $1^{st}$ and $3^{rd}$ digits (static);
2. Adding the day of week (dynamic); and
3. Replacing the $2^{nd}$ digit with "6" (static).

In some embodiments, these three operations and their sequences will be memorized by the user. Note that the same set of operations applied in a different order will create different transformed one-time passwords. Assume that the received one-time password is 293751, and also assume that the day of the week is Monday, corresponding to the second day of the week. Then the transformation operations will be as follows:

293751 - - - Rule 1→392751 - - - Rule 2→392753 - - - Rule 3→362753.

The user device and/or server may then apply these operations in the same sequence to verify the transformed one-time password.

Example 2

Other example operations that can be combined to produce transformation rules include:

(A) Switching of digits, for example switching the second and fifth digit of the one-time password.

(B) Adding/subtracting a fixed number or dynamic number to the one-time password. For example, addition of 5 or subtraction of the day of the month.

(C) Inserting a fixed or dynamic number at some location. For example, inserting 2 as the fourth digit or inserting the day of the week as the second digit.

Example 3

For a numeric one-time password, assumed to be 9853736 for the present example:

1. Adding a fixed single digit number, for example 9853736+4→9853740.

2. Subtracting a fixed single digit number, for example 9853736−5→9853731.

3. Adding/subtracting a dynamic number like "day of week" or "day of month". Assume it is Thursday, then day of week will be 4 so the one-time password will be 9853736+4→9853740.

4. Reversing the digits of the one-time password, for example 9853736→6373589.

5. Inserting a fixed/dynamic single digit number at a predefined position. For example, the user chooses to insert 5 between the $2^{nd}$ and $3^{rd}$ digits. Thus, 9853736→98553736.

6. Discarding a digit. For example, the user chooses to discard the $5^{th}$ digit. Thus, 9853736→985336.

7. Swapping two digits. For example, the user chooses to swap the $3^{rd}$ and $6^{th}$ digits. Thus, 9853736→9833756.

8. Replacing two or three consecutive digits with their sum. For example, the user chooses to replace the $3^{rd}$ and $4^{th}$ digit with their sum. Thus, 9853736→988736.

9. Replacing two consecutive digits with their product. For example, the user chooses to replace the $3^{rd}$ and $4^{th}$ digit with their product. Thus, 9853736→9815736.

10. For all above examples, one variation can be a choice of a dynamic position for replacement/swapping or discarding a digit.

Example 4

For an alphanumeric one-time password, assumed to be Hwe2fg8Y:

1. Changing the case of the $n^{th}$ alphabetic character. For example, the user chooses to change the case of the $2^{nd}$ alphabetic character. Thus, Hwe2fg8Y→HWe2fg8Y.

2. Replacing the $n^{th}$ alphabetic character with a fixed alphabetic character. For example, the user chooses to replace the $4^{th}$ alphabetic character with "t". Thus, Hwe2fg8Y→Hwe2tg8Y.

3. Replacing the $n^{th}$ alphabetic character with a dynamic alphabetic character. For example, the user chooses to replace the $3^{rd}$ alphabetic character with the day of week and it is "Tuesday". Thus, Hwe2fg8Y→HwT2fg8Y.

4. Reversal.

5. Replacing with the next alphabetic character. For example, the user chooses to replace the $1^{st}$ alphabetic character with the next alphabetic character. Thus, Hwe2fg8Y→Iwe2fg8Y.

Additional discussion of various embodiments described herein will now be provided. Transformation rules for one-time passwords can provide multi-factor authentication according to various embodiments described herein. Multi-factor authentication is an approach to authentication which requires the presentation of two or more of three independent authentication factors: a knowledge factor (something only the user knows), a possession factor (something only the user has), and an inherence factor (something only the user is). The knowledge factor may be provided by a static password or PIN. A possession factor may be provided by the mobile device or the email account of the user. An inherence factor may be provided by biometrics. Unfortunately, a static password can be hacked and a hacker may obtain possession of a user's mobile device or email account.

Conventionally, a one-time password is directly entered as it is received. Thus, a conventional one-time password works on the assumption that a genuine user possesses the target mobile device or email account. However, a hacker can overcome this assumption if the hacker obtains access to the mobile device or email account. Moreover, since the knowledge factor is static, it can also be more vulnerable to hacking.

In contrast, various embodiments described herein can provide a mechanism to embed a static and/or dynamic knowledge factor in a one-time password, such that the transformed one-time password can only be generated by a genuine user and verified by a genuine server or user device. The knowledge factors described herein can be more secure, as they cannot be exposed easily, compared to a traditional password or PIN. The knowledge factor is a set of rules applied to a one-time password in a certain order for transformation. The set of rules and order of transformation may be thought of as a one-time password transformation contract that is shared between a genuine user and the system. Each rule can be static or dynamic in nature. Thus, it can become very difficult for hackers to anticipate these rules.

Accordingly, the one-time password can provide a possession factor, and the transformation rules can provide a knowledge factor for multi-factor authentication that can be combined into a single, transformed, one-time password. As such, a one-time password with transformation rules according to various embodiments described herein can be used as a password-less multi-factor authentication scheme, because multi-factor authentication is built into the one-time password as transformed by the transformation rules. Moreover, the knowledge factor can be more strong, as it is remembered by the end user as rules instead of simple numbers or characters. Moreover, since the knowledge factor is remembered by the user, it need not be exposed directly to other good or bad users. Moreover, only a single entry may need to be made for multi-factor authentication. Thus, the risk of fraud arising from compromised possession factors may be reduced or eliminated.

According to various embodiments described herein, the transformation rules may be used in addition to or instead of a traditional password/PIN. Thus, the user does not need to remember a password or PIN for authentication. Moreover, various embodiments described herein have been described in connection with one-time passwords. However, transformation rules may also be used with conventional PINs, according to various embodiments described herein. In some embodiments, a dynamic transaction rule may be used in combination with a conventional PIN so that a static password or PIN may be replaced by the dynamic password or PIN that uses transformation rules according to various embodiments described herein. In these embodiments, although only a single login password or PIN may be provided to the user, the password or PIN that is entered by the user can vary dynamically depending upon the dynamic operation in the password transformation rule.

Use of an app and/or other hardware/software on the user device for transforming one time passwords may add to user convenience, but it may transform the knowledge factor of the transformed one-time password into a possession factor. Thus, anyone who is possession of the user device may be able to derive the correct transformed one-time password, in a manner that is similar to auto-saving of the userid and static password on a browser. In order to ensure that a genuine user is transforming the one-time password, the one-time password transformation rule should be a pure knowledge factor (i.e., the transformation rule should be memorized). An app could assist the user in transforming a one-time password, for example by providing a calculator to assist the user in addition or subtraction. However, in order to provide an enhanced security level, what needs to be added or subtracted should only be known to the genuine user and not stored in the user device. Rather, a user and server can previously establish one-time password processing rules, for example at the time of registration. During user authentication, the server may generate a one-time password and send it to the user's registered device/email id. The user then applies transformation rules to the one-time password and sends it back to the server. The server applies the user device transformation rules to the one-time password that it sent to the user and compares the result with the transformed one-time password that was received at the server. Thus, in these embodiments, both the user and the server need to do the same transformation processing, but the transformation rules are not saved at the user device.

Various embodiments described herein may also replace a conventional userid and password because the transformed one-time password can incorporate a knowledge factor as well as a possession factor, so that there may be no need to have a separate static password/PIN. Thus, a user may not need to remember a password or PIN for authentication. The user may only need to remember the one-time password transformation rule.

\* \* \*

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
   performing by a processor operations comprising:
   receiving from a user, a one-time password transformation rule to be applied by the user to a one-time password that is received, so as to transform the one-time password that is received;
   sending a one-time password to the user;
   receiving a response to the one-time password from the user; and
   selectively authenticating the user based on the response corresponding to the one-time password as transformed by the one-time password transformation rule.

2. A method according to claim 1 wherein the receiving a one-time password transformation rule comprises:
   providing a list of a plurality of one-time password transformation rules; and
   receiving a selection of one of the plurality of one-time password transformation rules.

3. A method according to claim 1 wherein the receiving a one-time password transformation rule comprises:
   receiving a proposed one-time password transformation rule; and
   selectively sending a confirmation that the proposed one-time password transformation rule is acceptable, responsive to verification that the proposed one-time password transformation rule meets a predefined criterion.

4. A method according to claim 1 further comprising:
   proceeding with a transaction in response to a confirmation that the response corresponds to the one-time password as transformed by the one-time password transformation rule.

5. A method according to claim 1 wherein the one-time password comprises a number and wherein the one-time password transformation rule comprises a mathematical operation that is performed on the number.

6. A method according to claim 1 wherein the one-time password comprises a first alphabetic character and wherein the one-time password transformation rule comprises a transformation that is performed on the first alphabetic character to produce a second alphabetic character.

7. A method according to claim 1 wherein the one-time password comprises a first symbol and wherein the one-time password transformation rule comprises a transformation that is performed on the first symbol to produce a second symbol.

8. A method according to claim 1 wherein the receiving a one-time password transformation rule to be applied by the user, the sending a one-time password to the user, the receiving a response to the one-time password, and the selectively authenticating the user based on the response corresponding to the one-time password as transformed by the one-time password transformation rule are all performed by a server that communicates with a user device of the user over a network.

9. A method according to claim 1 wherein the receiving a one-time password transformation rule to be applied by the user, the sending a one-time password to the user, the receiving a response to the one-time password, and the selectively authenticating the user based on the response corresponding to the one-time password as transformed by the one-time password transformation rule are all performed by a user device of the user.

10. A method according to claim 1 further comprising:
    defining the one-time password transformation rule;
    receiving the one-time password; and
    sending the response to the one-time password.

11. A method according to claim 10 wherein the defining the one-time password transformation rule, the receiving the one-time password, and the sending the response to the one-time password are all performed by a user device of the user.

12. A method according to claim 1 wherein the sending is preceded by:
    receiving a userid and a static password from the user; and
    wherein the sending comprises selectively sending the one-time password to the user responsive to validating the userid and the static password.

13. A method according to claim 12 wherein the one-time password transformation rule comprises a plurality of operations to be performed sequentially by the user on the one-time password, the plurality of operations comprising a dynamic operation that changes as a function of time and a static operation that does not change as a function of time.

14. A method according to claim 1 wherein the one-time password transformation rule comprises a plurality of operations to be performed sequentially by the user on the one-time password.

15. A method according to claim 14 wherein the plurality of operations comprises a dynamic operation that changes as a function of time.

16. A method according to claim 15 wherein the plurality of operations further comprises a static operation that does not change as a function of time.

17. A method according to claim 15 wherein the dynamic operation comprises adding a number representing a current day to the one-time password.

18. A computer system comprising:
    a processor; and
    a memory coupled to the processor and comprising computer readable code that, when executed by the processor, causes the processor to perform operations comprising:
    receiving from a user, a one-time password transformation rule to be applied by the user to a one-time password that is received, so as to transform the one-time password that is received;
    sending a one-time password to the user;
    receiving a response to the one-time password from the user; and
    selectively authenticating the user based on the response corresponding to the one-time password as transformed by the one-time password transformation rule.

19. A computer program product comprising:
    a computer readable storage medium having computer readable program code embodied in the medium that, when executed by a processor of a computer system, causes the computer system to perform operations comprising:
    receiving from a user, a one-time password transformation rule to be applied by the user to a one-time password that is received, so as to transform the one-time password that is received;
    sending a one-time password to the user;
    receiving a response to the one-time password from the user; and selectively authenticating the user based on the response corresponding to the one-time password as transformed by the one-time password transformation rule.

* * * * *